United States Patent Office 2,907,638
Patented Oct. 6, 1959

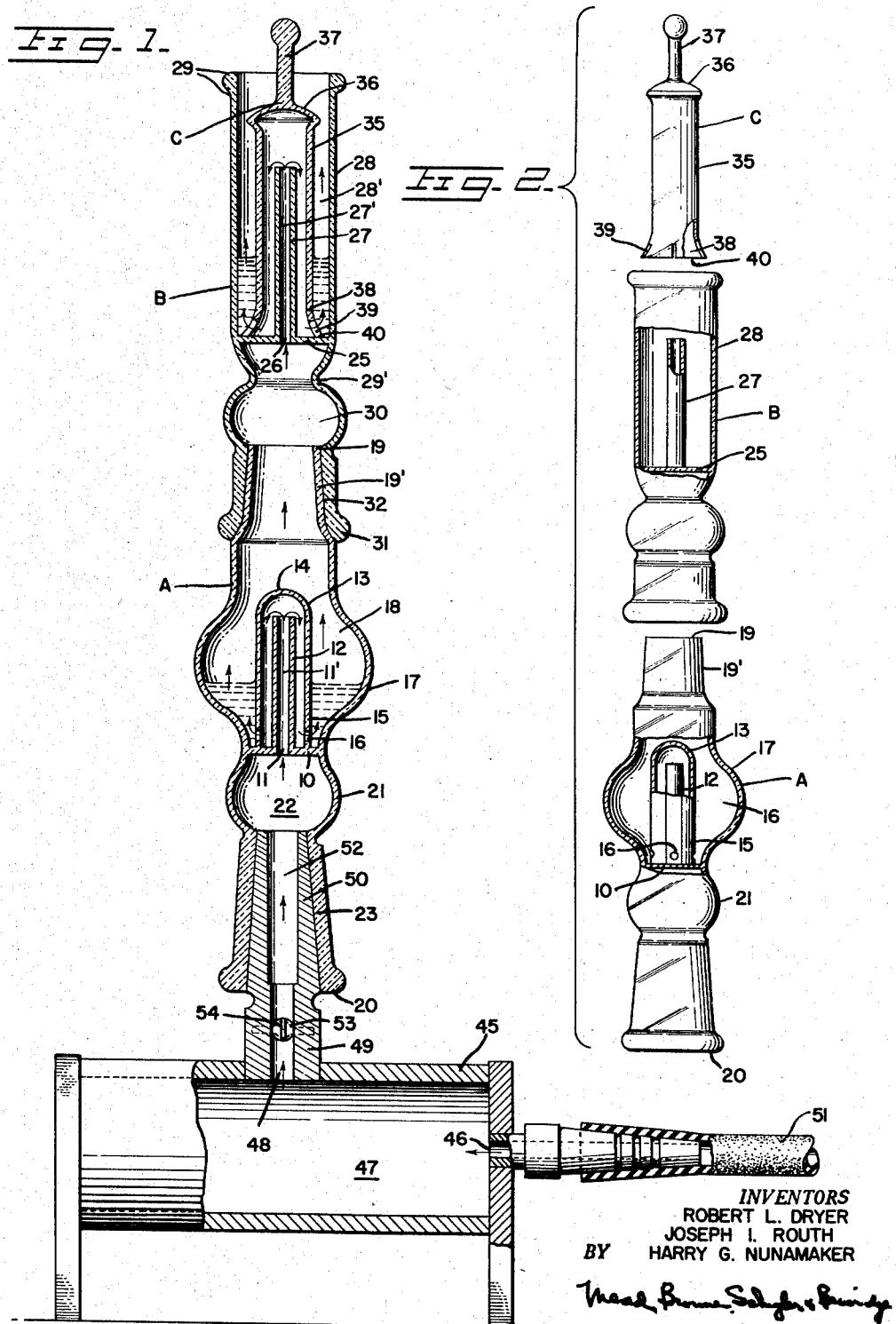

2,907,638

APPARATUS FOR QUANTITATIVE ISOTHERMAL DISTILLATION

Robert L. Dryer, Joseph I. Routh, and Harry G. Nunamaker, Iowa City, Iowa, assignors to the State of Iowa for the benefit of the State University of Iowa, Iowa City, Iowa, an educational institution of Iowa Application September 24, 1956, Serial No. 611,650

3 Claims. (Cl. 23—253)

This invention relates to an apparatus for the quantitative isothermal distillation of volatile liquids and gaseous substances.

Several types of apparatus for quantitative isothermal distillation of volatile liquids or gaseous substances to ascertain the amount of a particular ingredient present therein, such as the quantity of urea present in blood or urine, are known, but such apparatus is usually complex, bulky, and expensive. To perform a single determination by means of such apparatus has been tedious and time-consuming and, unless special precaution and care are exercised by the operator, the results obtained are often inconclusive.

While the dish apparatus of Conway (Microdiffusion Analysis and Volumetric Error, Conway, Crosby, Lockwood and Son, London, 1950, page 7 et seq.) is the ultimate in simplicity as far as construction is concerned, distillation therein proceeds only by diffusion and the transfer is comparatively slow. Kjeldahl and others have used steam distillation but, again, the time for obtaining a determination is rather long. The apparatus of prior isothermal distillation methods (Peters and Van Slyke, Quantitative Clinical Chemistry, Williams and Wilkins Co., Baltimore (1931), vol. 2, p. 548) requires the use of large samples for results of acceptable accuracy and considerably large volumes of air or other gases must be utilized therewith. When it is considered that a significant percentage of the work load in most clinical chemistry laboratories consists of the determination of the amount of urea present in blood, urine, or other biological substances, it will be appreciated that there is a need for both an apparatus and a method for quickly and accurately performing such distillation simultaneously with a plurality of samples, the results being as accurate as possible.

Furthermore, while it has been customary to determine the amount of urea present in the trap solution by titration, no photometric method for ascertaining the quantity of urea is known wherein the results achieved are accurate over more than a very narrow range of concentrations.

Accordingly, an object of the invention is to provide an apparatus for the quantitative isothermal distillation of volatile liquid or gaseous substances which obviates the disadvantages present in apparatus now being used for such distillation.

Another object of the invention is to provide an apparatus for the quantitative distillation of volatile liquid or gaseous substances which is simple in construction, has a minimum of separable parts and which is economical to manufacture.

Still another object of the invention is to provide such an apparatus of a particular configuration wherein each part affords optimal relation between surface and volume so that an accurate determination of the amount of volatile component present in a solution can be made from a very small sample of solution in a few minutes time.

A further object is to provide an apparatus for quantitatively isothermally distilling a volatile liquid or gaseous substance from a sample solution and trapping the distillation product in a specific liquid whereby the amount of the distillation product originally present in the sample may be quickly and accurately ascertained photometrically.

In attaining the objects of the invention, one of the features resides in forming the apparatus from three separable units of particular configuration, the units adapted to be frictionally interconnected in an upright position so as to provide for the passage of a gaseous stream therethrough.

Another feature resides in providing capped members about the upright passageways in each chamber, each member having a plurality of apertures whereby the inert gas is broken into bubbles which pass through the sample solution in the first chamber, remove the volatile component therefrom and bubble it through the trap solution in the second chamber, wherein the volatile component is reacted with the trap solution for later determination of concentration.

Another feature resides in providing a particular trap solution in the trap chamber which assumes a particular color or undergoes a particular measurable change upon reacting with the ingredient vapors, the intensity of the color or particular change being directly related to the concentration of the ingredient, which concentration might be accurately determined photometrically or by other measurement.

Still another feature resides in utilizing a trap solution consisting of two parts by volume of saturated boric acid with three parts by volume of Nessler's compound described by Koch and Hanke, infra, so as to enable a quick and accurate photometric measurement of the amount of ammonia present in the trap solution and, thus, in effect, determine the amount of urea originally present in the sample solution.

Other objects, features and advantages of the invention will become apparent from the following specification taken in conjunction with the drawing, wherein:

Fig. 1 is a sectional view of an embodiment of the apparatus of the invention mounted on a manifold; and Fig. 2 is a telescopic view of the principal components of the invention, partially in section.

As pictured in the drawing, the preferred embodiment for an apparatus for the quantitative isothermal distillation of a volatile liquid or gaseous substance from a sample solution comprises three separable units, namely a supply receptacle A, a trap receptacle B, and a footed bubbler cap C. Supply receptacle A includes a base portion 10 having an opening 11 therethrough and a cylindrical member 12 extending upwardly from base 10 about the peripheral edge of opening 11 and forming a passageway 11'. Also extending upwardly from the base 10 and completely surrounding the cylindrical member 12 is a capped tubular member 13 having its uppermost end 14 rounded or domed while its lower end 15 adjacent the base 10 is provided with a plurality of spaced apertures 16 about its periphery.

Integral with and extending upwardly and outwardly from the peripheral edge of the base 10 is the exterior wall 17 of the supply receptacle A, which wall continues upwardly and inwardly for a short distance, forming a pear-shaped supply chamber 18 above the base 10. Supply chamber 18 is pear-shaped in configuration so as to present a large, free surface area in proportion to the small volume of sample solution therein and to promote stirring of the solution by the gaseous stream bubbling therethrough from the apertures 16. Such a surface-volume relationship is important in efficiently promoting the transfer of the volatile component from the supply chamber 18 into trap receptacle B. Continuing upwardly, the exterior wall 17 tapers slightly inwardly to the top edge 19 of supply receptacle A to form a tapered outer surface 19'. Also integral with the peripheral edge of the base 10 and depending first downwardly and outwardly and then downwardly and inwardly before tapering slightly outwardly to the lower end 20 of supply receptacle A is exterior wall 21, forming a smaller bulbular chamber 22 below the base 10 and an outwardly tapered inner surface 23. Further, the base 10 is secured to the curved surfaces of the wall between pear-shaped supply chamber 18 and bulbular chamber 22 in order to achieve a strain-free seal of great mechanical strength.

Trap receptacle B includes a base 25 having an opening centrally disposed therethrough and a cylindrical member 27 extending upwardly from the base 25 about the peripheral edge of the opening 26 and forming a passageway 27'. Exterior wall 28 extends vertically upwardly from the peripheral edge of the base 25 to form a trap chamber 28' provided with a pouring lip 29 at its top edge. Exterior wall 28 also depends downwardly and inwardly below base 25 to form a neck portion 29' before extending outwardly and downwardly and inwardly and downwardly to form bulbular chamber 30. Neck 29' acts as a baffle and prevents spray from the pear-shaped supply chamber 18 from being mechanically carried over into chamber 28' via the opening 26 and passageway 27'. Further, the downward and inward slope of outer wall 28 of trap receptacle B below the base 25 creates a strain-free seal of great mechanical strength between the base 25 and the inner wall of receptacle B to which it is secured.

Bulbular chamber 30 may be packed with glass wool wet or impregnated with a chemical or chemicals which selectively remove one or more volatile substances from a mixture, allowing only a single vapor to pass into chamber 28' where it may be trapped. Neck 29' aids in holding the glass wool in proper position within the chamber 30. Below chamber 30, exterior wall 28 tapers downwardly and outwardly to the lower end 31 of trap receptacle B to form an outwardly tapered inner surface 32. When supply receptacle A and trap receptacle B are of glass, the inwardly tapered outer surface 19' is ground to a smooth fit into the outwardly tapered inner surface 32 over a length such that when the two halves of the joint are assembled the surface 19' extends beyond the ground portion of surface 32. This permits a tight fit even after some wear or abrasion of the glass has occurred.

As illustrated in the embodiment of the apparatus in Fig. 1, the tapered exterior surface 19' of supply receptacle A frictionally engages the inner tapered surface 32 of trap receptacle B so that the latter receptacle is supported in an upright position upon the former.

Footed bubbler cap C includes a cylindrical shell 35 having a closed upper end 36 provided with a handle 37 extending vertically therefrom. At its lower end, shell 35 tapers downwardly and outwardly for a short distance and this tapered portion 38 is provided with a plurality of spaced apertures 39 about its periphery. The lower edge 40 of the bubbler cap C rests upon the upper surface of base 25 when the footed bubbler cap C is placed about tubular member 27 of trap receptacle B.

To continuously provide a gaseous stream through the supply receptacle A and trap receptacle B, it is preferable to use a manifold 45 having an inlet 46, a supply chamber 47 and an outlet 48. Extending vertically from the outlet 48 is an outlet tube 49 whose uppermost outer surface 50 tapers inwardly and is adapted to frictionally engage the inner outwardly tapered surface 23 of supply receptacle A.

While an inert gas, such as air, steam, nitrogen or the like is introduced into supply chamber 47 of the manifold 45 by conduit 51 and inlet 46, the rate of flow of the gas through the outlet 48 and passageway 52 of the outlet tube 49 is controlled by regulating valve 53, located on the lower end of the outlet tube. Valve 53 includes a tapered plug 54 held in place by spring tension (not shown). Plug 54 is pierced with a one or two mm. hole which provides an adequate stream of inert gas to enter into passageway 52 of outlet tube 49. As the plug is rotated, the flow of gas may be reduced in rate or cut off entirely, depending upon the position of the hole with respect to the passageway 52.

While it is preferable to make the apparatus of the invention of glass, it is to be understood that other materials such as plastic and the like may be substituted therefor without detracting from the scope of the invention.

The apparatus of this invention may be used with many volatile liquids or gaseous substances, including alcohol (as acetic acid) in blood, urine or tissue; arsenic (as arsine) in blood, urine or tissue; formaldehyde in foods, etc.; hydrogen sulfide in sewage, etc.; and chlorine in water, bleaches, etc. However, while the operation of the apparatus will be described in connection with liquids containing urea, it is to be understood that the invention is not in any way limited in scope thereby. Supply receptacle A is mounted upon outlet tube 49 of manifold 45 after valve 53 is turned so as to cut off the supply of gas from the manifold. A known volume of a liquid such as blood, urine, milk, spinal fluids, tissue extracts or the like, which is to be analyzed for urea content, is placed within the supply chamber 18 and a small amount of the enzyme urease, which possesses the ability to transform urea into ammonium carbonate, is added thereto. Supply receptacle A is then permitted to stand for a predetermined incubation period to enable the enzyme to perform its function. To trap receptacle B is added a measured volume of a solution or reagent such as hydrochloric acid, boric acid, or the like, which will react or combine with free ammonia. The footed bubbler cap C is placed about the cylindrical member 27 and is supported by base 25. At the end of the incubation period, a few drops of anti-foaming agent is added to supply chamber 18 and then a few drops of a strong solution of an alkali is added thereto. Trap receptacle B is immediately placed upon and in frictional engagement with supply receptacle A and valve 53 is opened to permit a stream of inert gas to flow through passageway 52 of outlet tube 49, and through chamber 22, opening 11 and passageway 11' of cylindrical member 12. The gas then passes outwardly from cylindrical member 12, downwardly within tubular member 13, outwardly through the plurality of apertures 16 at the base of the tubular member 13, and bubbles through the sample solution being tested. The rate of flow of gas through the sample solution is slow enough to prevent loss of the liquid by spattering. The gas carries all the ammonia formed by the reaction of the alkali with the ammonium carbonate upwardly through the top 19 of supply receptacle A and into chamber 30 of trap receptacle B. The gas and ammonia continue upwardly through opening 26 in base 25, through passageway 27' in cylindrical member 27, downwardly within shell 35 of footed bubbler cap C and out through the plurality of spaced apertures 39 at the base of shell 35. The ammonia, bubbling through the solution or reagent in trap chamber 28', completely reacts therewith while the inert gas passes outwardly through the top of the trap receptacle B. After a predetermined aeration period, the valve 53 from the manifold is closed and trap receptacle B removed from the apparatus. The trap solution of trap chamber 28' is then examined chemically or physically to determine the amount of ammonia present therein, which amount is directly related to the original urea content of the sample in supply chamber 18. All of the non-urea contaminants are left behind in supply chamber 18 and an accurate determination of urea originally in the sample may be obtained.

Samples of blood as small as 0.1 ml. may be analyzed within twenty-five minutes, allowing for a fifteen minute incubation period and a ten minute aeration period. If the contents of the trap receptacle are composed of a specific modification of Nessler's reagent, a color is formed when ammonia reacts therewith which, under prescribed conditions, is directly proportional to the quantity of ammonia derived from urea. This may be measured photometrically immediately after aeration is complete. The number of samples which may be treated simultaneously may vary with the number of outlet tubes in the manifold. For example, using a manifold with ten outlets, ten samples may be simultaneously analyzed in less than forty-five minutes from start to finish.

The liquid contents of the trap chamber 28' may be transferred by means of the pouring lip 29 into some other apparatus for direct measurement of density, absorbency, acidity, or other chemical or physical properties. The liquid contents of the trap chamber may also be treated by addition of a chemical or reagent which will produce some desired alteration such as the formation of a color, solution of a precipitate, formation of a colloidal system or other result. Thus, the solution produced by the alteration is more suitable for measurements of the type above described.

In the case of urine, which contains preformed ammonia, pretreatment of the sample is required prior to placing it within the supply chamber. This pretreatment consists of pouring the urine through a column filled with acid-washed Permutit or similar material to remove the ammonia present.

It has been noted that a short aeration time of approximately ten minutes insures the complete removal of the ammonia from the supply chamber 18. This short aeration period is made possible by the particular design of the apparatus which permits efficient bubbling and minimizes the total volume of the apparatus so that there is an optimal relation between the surface and volume of the apparatus with a minimum of "dead" space therein.

Known methods for determination of urea can be categorized in two ways. The first, and much the older, depends upon the degradation of urea to an ammonium salt followed by the determination of ammonia. This degradation may be achieved by means of the enzyme urease or by autoclaving, usually under acid conditions at elevated temperatures and pressures. The second category depends upon the condensation of urea with an alpha-alphadiketone to yield a colored product. While colorimetric methods have the advantage of speed, the conditions under which the color is developed must be controlled with great care and usually the color does not bear a very linear relationship to the amount of urea present in the sample. Although various methods to improve the reliability of colorimetric urea assays have been proposed, none have been completely successful.

One of the classical procedures in clinical biochemistry has been the determination of urea by the method of Van Slyke and Cullen and its many variations. In these procedures, a sample of blood or other biological substance is treated with urease and incubated until the urea has been converted to ammonium carbonate. The mixture is then made strongly alkaline and the liberated ammonia blown into a receiver tube by means of a stream of air. The ammonia is trapped in the receiver tube either by standard hydrochloric acid, the excess of which may be back-titrated, by Nessler's solution whereby a color is developed, or by boric acid, in which the ammonium carbonate of the solution may be directly titrated.

It has been found by many who have used Nessler's solution that the color produced does not follow Beer's law except in a very narrow range and at higher concentrations the absorbence is distorted by the presence of a turbidity which may even form a flocculent precipitate. Beer's law is an eponymic designation of the physical principles which govern the absorption of light by colored solutions or other absorbing media. This states, inter alia, that under given conditions the absorbence of light is proportional to the intensity of the color, which in turn is proportional to the amount of the pigment. Textbook of Quantitative Analysis, Kolthoff and Sandell, MacMillan Co., New York, 1943.

Investigations of various formulations of Nessler's reagent which have been described in the literature produced results which left a great deal to be desired. A consistent observation of applicants, regardless of which form of Nessler's reagent was employed, was that when the ammonia was driven through the reagent in the trap chamber of the apparatus illustrated in Fig. 1, the local concentration gradient was such that the final product, ammonium mercuric iodide, actually precipitated on the exposed glass surfaces. This precipitate was not eliminated by alteration of air flow or by simple dilution of Nessler's reagent. Furthermore, in spite of the presence of such protective colloids as gum ghatti and polyvinyl alcohol, a turbidity uniformly developed in the solution if allowed to stand for more than ten or fifteen minutes. Even when boric acid was utilized as the trapping solution in trap chamber 18, after which the solution was Nesslerized, the problem of turbidity remained, although the problem of precipitation had been eliminated.

Applicant has found that the above disadvantages are eliminated when the solution in trap chamber 28' consists of a mixture of two parts by volume of saturated boric acid with three parts by volume of Nessler's compound prepared in the following manner as described by Koch and Hanke in Practical Methods of Biochemistry, 6th ed., Williams & Wilkins Co., Baltimore, 1953, page 494, et seq. Prepare one liter of 10% (by volume) sodium hydrate solution. Prepare a solution of potassium mercuric iodide by dissolving 22.5 grams of iodine in 20 cc. of $H_2O$ containing 30 grams of potassium iodide. When solution is complete, add 30 grams of pure metallic mercury. Shake well until supernatant liquid has just lost all of the yellow color due to iodine. Decant aqueous layer into a 200 cc. volumetric flask and add a drop of a similar solution of iodine in potassium iodide until the well mixed solution just gives a faint test for free iodine when a few drops are added to a few cubic centimeters of a cooled solution of soluble starch. The aqueous layer after this last treatment is now diluted to 200 cc. To 975 cc. of the 10% sodium hydrate solution now add the entire solution of potassium mercuric iodide prepared above. Mix and allow to clear by standing.

In a concentration range from twenty micrograms to one hundred twenty-five micrograms of nitrogen, the color produced by this solution is strictly proportional to concentration. The color is clear and remains free of turbidity for periods as long as an hour. Recovery of a standard urea solution was studied using a glycerol extract of urease made substantially according to Koch (page 500 of aforementioned publication). The incubation time was studied first and it was found that fifteen minutes was adequate to completely destroy the urea content of 0.2 of a cc. of blood at B.U.N. (blood urea nitrogen) levels of one hundred and fifty mg. percent. A ten minute aeration time was adequate to transfer the liberated ammonia to the upper chamber and required approximately nine liters of air per unit. The following is a specific example of a preferred method for determining the quantity of urea present in a substance by isothermal distillation with the apparatus described in the drawing. However, it is to be understood that this example is merely illustrative of one method in which the quantity of urea present in a sample may be determined and the invention is not to be limited thereto.

Example I 0.2 cc. of blood was added to the supply chamber 18. To this was added 0.5 cc. of a 1–10 solution of Koch's glycerol-urease extract, making the dilution with phosphate buffer (pH=6.8, ionic strength=0.1). The solution was mixed by gentle swirling and allowed to stand at room temperature for fifteen minutes. 2.0 cc. of the borate-Nessler's solution (2 volumes saturated boric acid plus 3 volumes Nessler's compound according to Koch and Hanke, described supra) was placed in trap chamber 28' of trap receptacle B and footed bubbler cap C was placed within the trap chamber. Following the fifteen minute incubation period in the supply chamber, three drops of anti-foam A (Dow-Corning) was added thereto plus 0.5 cc. of saturated potassium hydroxide. Immediately thereafter the trap receptacle B was connected to the upper portion of the supply receptacle A, and a stream of air was passed through the two receptacles from the manifold. After a ten minute aeration period, 2.5 cc. of 7.5% sodium hydroxide was added to the solution in trap chamber 28' after the trap receptacle had been removed from the supply receptacle. Following a stirring of the solution by means of the bubbler cap C, the colored solution was poured into a cuvette and read in a spectrophotometer at a wave length of 520 mu. The absorbence of 100 gamma of nitrogen is 0.690.

Having fully described the invention, what is claimed is:

1. An analytical apparatus for the quantitative isothermal distillation of volatile liquids and gaseous substances to ascertain the amount of a particular ingredient present therein consisting essentially of an elongated tubular supply recaptacle and an elongated tubular trap receptacle removably mounted on the upper end of said supply receptacle, a base within said supply receptacle having an opening therethrough, said supply receptacle above said base defining a pear-shaped supply chamber for holding a known volume of sample fluid to be tested, a tubular member extending upwardly from said base about said opening, a second tubular member extending upwardly from said base about said first tubular member, said second member having a capped upper portion and a plurality of spaced apertures about the lower peripheral surface thereof, said supply receptacle including a bulbular chamber located below said base and means formed by the lower end of said supply receptacle below said bulbular chamber for engagement with a gas supplying conduit, said elongated tubular trap receptacle having its lower end shaped for frictional engagement with said upper end of said supply receptacle, said trap receptacle having a base spaced from said lower end, said trap receptacle having a peripherally constricted portion disposed between said base and said lower end to act as a baffle for any spray rising from said supply receptacle, the portion of said second receptacle above said base including a trap chamber for holding a vapor trapping solution, a tubular member extending upwardly from said base about said opening and a removable capped cylindrical shell extending upwardly from said base about said tubular member, said shell being closed except for a plurality of spaced apertures located about its peripheral lower edge portion.

2. The analytical apparatus for the quantitative isothermal distillation of volatile liquids and gaseous substances defined in claim 1 including a fibrous filter impregnated with a vapor-absorbing compound securely disposed between the base and the lower end of said trap receptacle.

3. The apparatus as defined in claim 1, wherein said cylindrical shell has its lowermost surface tapered outwardly with a plurality of spaced apertures located about the periphery of said tapered surface, said shell having a handle integral with and extending upwardly from the capped upper surface thereof.

References Cited in the file of this patent

UNITED STATES PATENTS

| | | |
|---|---|---|
| 89,225 | Johnston | Apr. 20, 1869 |
| 241,579 | Abell | May 17, 1881 |
| 478,132 | Rowland | July 5, 1892 |
| 745,470 | Wilton | Dec. 1, 1903 |
| 2,070,578 | Bowman | Feb. 16, 1937 |
| 2,241,114 | Brunjes | May 6, 1941 |
| 2,283,262 | Kamlet | May 19, 1942 |
| 2,286,786 | Cloyd | June 16, 1942 |
| 2,290,436 | Kamlet | July 21, 1942 |
| 2,580,791 | Kahn | Jan. 1, 1952 |
| 2,738,852 | Freneau et al. | Mar. 20, 1956 |